(12) United States Patent
Thomas et al.

(10) Patent No.: US 12,094,654 B2
(45) Date of Patent: Sep. 17, 2024

(54) STORING ENERGY IN CARBON FIBER-BASED ELECTRIC VEHICLE BODY PANELS

(71) Applicant: University of Central Florida Research Foundation, Inc., Orlando, FL (US)

(72) Inventors: Jayan Thomas, Orlando, FL (US); Deepak Pandey, Orlando, FL (US); Kowsik Sambath Kumar, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 502 days.

(21) Appl. No.: 17/518,985

(22) Filed: Nov. 4, 2021

(65) Prior Publication Data

US 2022/0139639 A1 May 5, 2022

Related U.S. Application Data (60) Provisional application No. 63/109,441, filed on Nov. 4, 2020.

(51) Int. Cl.
*H01G 11/40* (2013.01)
*B60L 50/40* (2019.01)
(Continued)

(52) U.S. Cl.
CPC ............. *H01G 11/40* (2013.01); *B60L 50/40* (2019.02); *H01G 11/32* (2013.01); *H01G 11/44* (2013.01); *H01M 4/583* (2013.01)

(58) Field of Classification Search
CPC ........ H01G 11/32; H01G 11/40; H01G 11/44; H01M 4/583; B60R 16/0215; B60R 16/04; B60R 13/0237; B60R 13/0287
See application file for complete search history.

(56) References Cited

U.S. PATENT DOCUMENTS

| 4,865,931 A | 9/1989 | McCullough |
|---|---|---|
| 5,518,836 A | 5/1996 | McCullough |
| (Continued) | | |

FOREIGN PATENT DOCUMENTS

| CN | 105470003 A | 4/2016 |
|---|---|---|
| CN | 105679551 B | 2/2018 |
| (Continued) | | |

OTHER PUBLICATIONS

James F. Snyder; Structural Composite Capacitors, Supercapacitors, and Batteries for U.S. Army Applications, Proceedings of SMASIS08, ASME Conf on Smart Materials, Adaptive Sturcture and Intelligent Systems, Oct. 2008 (8 pages).

(Continued)

*Primary Examiner* — Amanda C. Walke
(74) *Attorney, Agent, or Firm* — Fleit Intellectual Property Law; Paul D. Bianco (57) ABSTRACT

Energized composites include vertically aligned graphene on carbon fibers (VGCF). The VGCF enhances surface area available for charge storage, acts as templates for depositing other charge storing materials and provides stability for a minimum of 100,000 discharge cycles. The final storage device is in the order of high strength carbon fiber matrix with active material, glass fiber separator with polymer electrolyte and another carbon fiber matrix with active material. To achieve higher voltage or current, devices can be connected in series or parallel, respectively. The whole structure is made into a structural component by infusing epoxy resin. An alternating pattern of energy storage devices allows for the epoxy resin to seep through the whole structure and strongly bind them to make a monolith multifunctional composite. The high strength energized composites can power any electrical devices including electric (Continued)

vehicles, portable electronics, and space vehicles without any tradeoff between energy and structural integrity.

20 Claims, 7 Drawing Sheets

(51) Int. Cl.
    *H01G 11/32*     (2013.01)
    *H01G 11/44*     (2013.01)
    *H01M 4/583*     (2010.01)

(56) References Cited

U.S. PATENT DOCUMENTS

| | | | |
|---|---|---|---|
| 6,361,900 | B1 | 3/2002 | Parmentier |
| 8,192,863 | B2 | 6/2012 | Best |
| 9,605,193 | B2 * | 3/2017 | Yuen ................. C01B 32/23 |
| 11,686,011 | B2 * | 6/2023 | Thomas ................ H01G 11/32 |
| | | | 204/471 |
| 2011/0164349 | A1 | 7/2011 | Snyder |
| 2015/0162140 | A1 | 6/2015 | Hucker |
| 2017/0050533 | A1 | 2/2017 | Wei |
| 2017/0200570 | A1 | 7/2017 | Ciocanel et al. |
| 2018/0040912 | A1 | 2/2018 | Chang |
| 2019/0103235 | A1 | 4/2019 | Hudak |
| 2020/0358079 | A1 | 11/2020 | Hudak |
| 2021/0126243 | A1 | 4/2021 | Lanning et al. |
| 2021/0126246 | A1 | 4/2021 | Gazda et al. |
| 2021/0147999 | A1 | 5/2021 | Thomas |
| 2023/0067318 | A1 | 3/2023 | Thomas et al. |

FOREIGN PATENT DOCUMENTS

| | | | |
|---|---|---|---|
| EP | 3871912 A1 * | 9/2021 | ............... B60K 1/04 |
| WO | 2023/022785 A1 | 2/2023 | |

OTHER PUBLICATIONS

Richard Reece et al., A High-Performance Structural Supercapacitor, ACS Appl. Mater. Interfaces, (2020), 12, 25683-25695 (20 pages).

Yuchen Wang, Development of structural supercapacitors with epoxy based adhesive polymer electrolyte; Journal of Energy Storage 26 (2019) 100968 (9 pages).

Yanfang Xu et al, High-Performance Structural Supercapacitors Based on Aligned Discontinuous Carbon Fiber Electrodes and Solid Polymer Electrolytes, ACS Appl. Mater. Interfaces, (2021), 13, 11774-11782 (9 pages).

Andrew S. Westover et al, Multifunctional high strength and high energy epoxy composite structural supercapacitors with wet-dry operational stability, J. Mater.Chem.A, (2015), 3, 20097-20102 (6 pages).

Natasha Shirshova et al, Structural composite supercapacitors, www.elsevier.com/locate/compositesa, Composites: Part A 46 (2013) 96-107 (12 pages).

Nicholas Hudak et al, Structural Supercapacitors with Enhanced Performance Using Carbon, J Electorchemical Society, 164 (4) A691-A700 (2017) (11 pages).

Leif Asp et al, Structural Battery and its Multifunctional Performanc, Advanced Energy & Sustainability Research, (2021) (9 pages).

Alexandru Vlad et al., Design Considerations for Unconventional Electrochemical Energy Storage Architectures; www.MaterialsViews.com; Advanced Energy Materials 2015, 54 pages.

Shengli Zhai et al., Textile energy storage: Structural design concepts, materials election and future perspectives; Energy Storage Materials 3 (2016) 123-139.

Varma, et al. Fiber-Type Solar Cells, Nanogerators, Batteries, and Suercapacitors for Wearable Applications; Advanced Science 2018, 5, 1800340, 32 pages.

Cherusseri et al., Self-Standing Cardon Nanotube Forest Electodes for Flexible Supercapacitors; RSC Advances 2015, 5, 34335-34341; The Royal Society of Chemistry.

Cherusseri et al., Ultra-flexible Fibrous Supercapacitors with Carbon Nanotube/polypyrrole Brush-like Electrodes, J. Mater. Chem. A. 2016, 4, 9910-9922; The Royal Society of Chemistry.

W. Liu et al., Flexible and Stretchable Energy Storage: Recent Advances and Future Perspectives; Advanced Materials; Advanced Science News 2017, 29, 1603436, 34 pages.

L. Dong et al., Flexible Electrodes and Supercapacitors for Wearable Energy Storage; a review by category Journal of Materials Chemistry A, 2016, 4, p. 4659-4685; The Royal Society of Chemistry.

X. Cai et al., Flexible Planar/Fiber-architectured Supercapacitors for Wearable Energy Storage Journal of Materials Chemistry C, 2014, 2, p. 1184-1200. The Royal Society of Chemistry.

J. Cherusseri et al., Self-Standing Cardon Nanotube Forest Electodes for Flexible Supercapacitors; RSC Advance 2015, 5, p. 34335-34341, The Royal Society of Chemistry.

Z. S. Wu et al., Three-Dimensional Nitrogen and Boron Co-doped Graphene for High-Performance All-Solid-State Supercapacitors; Advanced Materials, 2012, 24, p. 5130-5135.

L. F. Lai et al. Preparation of Supercapacitor Electrodes Through Selection of Graphene Surface Functionalities; vol. 6, No. 7, p. 5941-5951, ACS Nano 2012.

Wu et al., One Step Electrophoretic Deposition of Ni-Decorated Activated-Cardon Film as an Electrode Material for Supercapacitors; Journal of Physical Chemistry C 2010, 114, p. 6190-6196.

C. Du et al., Preparation and Preliminary Property Study of Carbon Nanotubes Films by Electrophoretic Deposition, Material Letters (Elsevier Science) 57, p. 434-438, Dec. 2002.

Tao et al., Fabrication of pH-sensitive Graphene Oxide-drug Superamolecular Hydrogels as Controlled Release Systems; Journal of Materials Chemistry 2012, 22, p. 24856-24861.

Y. He et al., Capacitive Mechanism of Oxygen Functional Groups on Carbon Surface in Supercapacitors; Electrochimica Acta (Elsevier Science) 282, p. 618-625, 2018.

Cherusseri et al., Hierarchically Mesoporous Cardon Nanpetal Based Electodes for Flexible Supercapacitors with Super-long Cyclic Stability, Journal of Materials Chemistry A 2015, 3, p. 21586-21598. The Royal Society of Chemistry.

P. Sirisinudomkit et al., Hydrid Energy Storage of Battery-type Nickel Hydroxide and Supercapacitor-type Graphene: redox additve and charge storage mechanism; Sustainable Energy & Fuels 2017, 1, p. 275-279; The Royal Society of Chemistry.

Shao et al., Mechanism Analysis of the Capacitance Contributions and Ultralong Cycling—stability of the isomorphous MnO2MnO2 core/shell Nanostructures for Supercapacitors; Journal of Materials Chemistry A 2015, 3, 6168-6176; Royal Society of Chemistry.

Brezesinski, et al., Pseudocapacitive Contributions to Chargw Storage in Highly Ordered Mesoporous Group V Transition Metal Oxides with Iso-Oriented Layed Nanocrystalline Domains, Journal of the American Chemical Society 2010, 132, p. 6982-6990.

International Search Report and Written Opinion for PCT/US2022/033881 dated Sep. 2, 2022.

International Preliminary Report on Patentability (IPRP) PCT/US2022/033881 dated Feb. 29, 2024.

* cited by examiner

STORING ENERGY IN CARBON FIBER-BASED ELECTRIC VEHICLE BODY PANELS

STATEMENT REGARDING FEDERALLY SPONSORED RESEARCH OR DEVELOPMENT

This invention was made with Government support under Award #ECCS-1351757 awarded by the National Science Foundation. The Government has certain rights in the invention.

FIELD OF THE DISCLOSURE

The disclosure relates to a novel approach to storing energy for powering electric vehicles by using carbon fiber-based composite supercapacitors or hybrid supercapacitor battery device as one or more body panels of the electric vehicle.

RELATED PATENTS AND APPLICATIONS

This disclosure relates to U.S. patent application Ser. No. 16/951,150 filed Nov. 18, 2020 and entitled "VERTICALLY-ALIGNED GRAPHENE-CARBON FIBER HYBRID ELECTRODES AND METHODS FOR MAKING SAME", which claims the benefit of Provisional Patent Application No. 62/937,378 filed Nov. 19, 2019 and entitled "VERTICALLY-ALIGNED GRAPHENE-CARBON FIBER HYBRID ELECTRODES AND METHODS FOR MAKING SAME". This disclosure also relates to Provisional Patent Application No. 63/233,476 filed Aug. 16, 2021 and entitled "DUAL FUNCTION ENERGY-STORING SUPERCAPACITOR-BASED CARBON FIBER COMPOSITE FOR BODY PANELS OF A VEHICLE". The entire contents of each of the patent applications identified in this paragraph are hereby incorporated by reference.

BACKGROUND

The electric vehicle industry is currently exploring a wide variety of ways to increase the energy storage capacity to achieve more than 500 miles per charge. A major challenge for electric vehicle manufacturers is to find a feasible way to achieve this goal. About 25% of the weight of the present electric vehicles is due to batteries. To increase the miles/charge of the electric vehicles, either more batteries could be added or another approach to store energy could be found. Adding more batteries further increases the net weight resulting in more energy required for vehicle propulsion.

Thus, there exists a need for an improved approach to store energy that can be used, for example, to power electric vehicles.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein.

SUMMARY OF THE DISCLOSURE

One aspect of the disclosure relates to an electric vehicle body panel comprises at least one carbon fiber-based composite supercapacitor or hybrid supercapacitor battery device. The at least one supercapacitor or hybrid supercapacitor battery device includes vertically aligned and attached graphene on carbon fibers of a cross weaved carbon fiber mat.

In one embodiment, the at least one supercapacitor or hybrid supercapacitor battery device comprises a plurality of supercapacitors or hybrid supercapacitor battery devices. The plurality of supercapacitors or hybrid supercapacitor battery devices can be connected in series and parallel combinations.

In an embodiment, the vertically aligned and attached graphene on carbon fibers include a pseudocapacitive transition metal oxide layer. The pseudocapacitive transition metal oxide layer can include manganese oxide or molybdenum oxide.

In an embodiment, the at least one supercapacitor or hybrid supercapacitor battery device includes a plurality of cross weaved carbon fiber mats. The plurality of cross weaved carbon fiber mats can be separated by a layer of epoxy. Adjacent mats of the plurality of cross weaved carbon fiber mats can be oriented 45 degrees with respect to each other.

Another aspect of the disclosure relates to an electric vehicle body panel comprising at least one carbon fiber-based composite supercapacitor or hybrid supercapacitor battery device. The at least one supercapacitor or hybrid supercapacitor battery device comprises: a first outer cross weaved carbon fiber mat; a cathode contacting the first outer cross weaved carbon fiber mat and including vertically aligned and attached graphene on carbon fibers of a cross weaved carbon fiber mat; a gel electrolyte contacting the cathode; an anode contacting the gel electrolyte and including vertically aligned and attached graphene on carbon fibers of a cross weaved carbon fiber mat; and a second outer cross weaved carbon fiber mat contacting the anode. The first outer cross weaved carbon fiber mat, cathode, anode, and second outer cross weaved carbon fiber mat are in a stacked configuration.

In some embodiments, at least one of the first and second outer cross weaved carbon fiber mats is coated with an epoxy. The first outer cross weaved carbon fiber mat and cathode can be oriented 45 degrees with respect to each other and the anode and second outer cross weaved carbon fiber mat can be oriented 45 degrees with respect to each other.

The gel electrolyte can be a polyacrylamide gel electrolyte. In some embodiments, the gel electrolyte is a coating applied to at least one of the cathode and the anode.

In one embodiment, the at least one supercapacitor or hybrid supercapacitor battery device comprises a plurality of supercapacitors or hybrid supercapacitor battery devices. The plurality of supercapacitors or hybrid supercapacitor battery devices can be connected in series and parallel combinations.

In certain embodiments, the vertically aligned and attached graphene on carbon fibers of at least one of the cathode and anode include a pseudocapacitive transition metal oxide layer. The pseudocapacitive transition metal oxide layer can include manganese oxide or molybdenum oxide.

In at least some embodiments, the at least one supercapacitor or hybrid supercapacitor battery device has an energy density of at least 10 Wh/Kg, a power density of at least 2.5 kW/Kg, and charge-discharge cycles of more than 5,000 with less than 15% degradation. The body panel can have a tensile strength of at least 50 MPa.

Another aspect of the disclosure relates to an electric device comprising at least one carbon fiber-based composite supercapacitor or hybrid supercapacitor battery device. The at least one supercapacitor or hybrid supercapacitor battery device includes vertically aligned graphene on carbon fibers of a cross weaved carbon fiber mat.

The at least one supercapacitor or hybrid supercapacitor battery device can include a plurality of cross weaved carbon fiber mats, with the plurality of cross weaved carbon fiber mats separated by a layer of epoxy and adjacent mats of the plurality of cross weaved carbon fiber mats oriented 90 degrees with respect to each other.

DETAILED DESCRIPTION

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

In general, one aspect of the disclosure relates to addressing the problem of increasing the miles/charge without adding extra weight by storing energy in one or more body panels of the vehicles. As disclosed herein, this can be achieved by using carbon fiber-based composite supercapacitors or hybrid supercapacitor battery devices which can act as both an energy and structural component of the car body. A unique, hierarchical architecture-based carbon fiber for storing energy (hereinafter "CASE") electrode with an unprecedented 100,000 charge-discharge cycles with less performance degradation has been developed. The CASE fibers when fabricated into an aqueous gel based solid-state asymmetric supercapacitor store energy via a combined EDLC-redox charge storage mechanism capable of delivering a voltage of 2 V with 20,000 cycles of charge-discharge with little or no performance degradation. Such a high cycle life is important when a supercapacitor or hybrid supercapacitor battery device is built into body panel of electric vehicles, as it will provide rechargeable mileage for the limited lifetime of the electric vehicle. These light-weight CASE fibers which are used to make supercapacitors or hybrid supercapacitor battery devices, are converted into carbon fiber composites with high tensile strength and impact energy which can then be used to make the body panels of electric vehicles. The results show that the CASE supercapacitors or hybrid supercapacitor battery devices prepared in the form of commercial grade composites have high mechanical strength with energy storing capabilities, thus proving its utility in powering a range of vehicles such as electric cars and aircrafts. CASE composite supercapacitors or hybrid supercapacitor battery devices offer reduced net weight, extra miles/charge, longer cycle life, and more protection than existing aluminum or steel body used for electric vehicle panels which serve as only the structural component.

Figure 1:
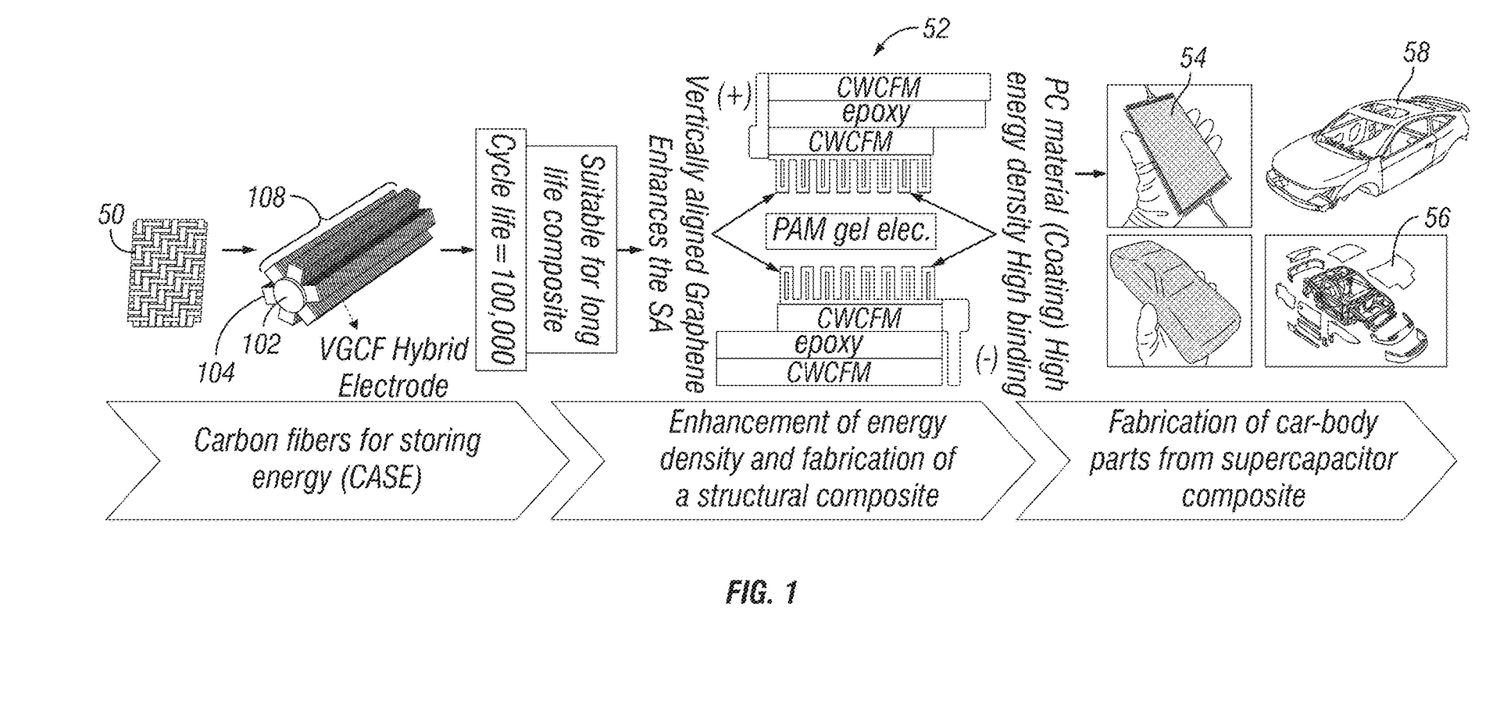
FIG. 1 schematically shows the development of carbon fibers for storing energy and providing structural stability for use in an electrical vehicle such as one or more body panels of an electric car.

Referring to the drawings, FIG. 1 schematically shows the development of energy-storing carbon fiber-based composites that can meet the standards of a commercial-grade carbon composite, which can be used to make body panels of electric cars. Cross weaved carbon fiber mats (CWCFM) 50 include carbon fibers 102 onto which graphene 104 is deposited to produce vertically aligned and attached graphene carbon fibers (VGCF) 108. These CASE fibers 108 are used to make supercapacitors or hybrid supercapacitor battery devices 52, which in turn are used to make carbon composites 54 with high tensile strength and impact energy. Therefore, these composites can be used to make body panels 56 of automobiles 58 and building components of aircraft and space vehicles.

The CASE supercapacitors have high energy density (ideally more than 10 Wh/kg) and power density (ideally more than 2.5 kW/kg) and are capable of undergoing more than 5,000 charge-discharge cycles with less than 15% degradation of capacitance. The CASE supercapacitors form the basis for carbon composites with the application of commercial grade epoxies. The composition of the composite can be varied to obtain suitable mechanical properties (e.g. similar to commercial (vehicle) grade carbon composite). CASE based composite as the outer panel of an electric vehicle allows 15-20% increase (based on an energy density of more than 100 Wh/kg and power density of 2.5 kW/kg) in the miles per charge.

Body panels that can store energy transform the energy logistics for the electric vehicle customers—being strong, capable of charging for the vehicle lifetime, non-toxic, non-flammable, and lightweight. Since CASE supercapacitors or hybrid supercapacitor battery devices can sustain long cycle life, the replacement of the automobile body panels is not required during its lifetime barring an accident.

This transformative approach satisfies the energy needs of electric vehicles by storing energy in their body panels in addition to the existing batteries. Since CASE supercapacitors or hybrid supercapacitor battery devices are made with aqueous non-toxic gel electrolytes, it is safe from fire hazards and toxic materials leakage in the event of an accident. The body of the car need not be replaced during the lifetime of the vehicle since the proposed CASE composites can provide several tens of thousands of charging cycles. This novel carbon fiber-based energy-storing composite can offer high tensile strength and durability to use as the light-weight body panels. Since the same process used to make commercial carbon composite is used to make CASE composites, the tensile strength and impact energy should be similar to existing vehicles. The CASE composite prepared can be easily molded to make the body panels of the automobiles.

Since carbon fiber composite provides lightweight and high strength, many car manufacturers use it in full chassis, body panels and roofs. Carbon fiber-based composites are an important component used to reach the government stipulated high fuel efficiency, even in non-electric cars. Major car companies like BMW uses carbon fibers significantly in its small electric car (i3®) to make lighter vehicles so that better miles/charge can be obtained. They are also extensively used in other industries like commercial aircraft, wind turbines, etc. Though carbon fibers are considered as the "right material at the right place" for the vehicle industry, they are more expensive than steel. Therefore, it is necessary to make maximum use of these carbon fibers in vehicles. The CASE composite disclosed herein maximizes use by storing energy in addition to serving as a structural component of the electric vehicle.

Representative characteristics of the CASE composite used simultaneously as the electrode of the energy storage device and a structural component include:

Carbon fibers should be sufficiently conductive with a high surface area. At the same time, it should exhibit other functional properties required for energy storage. The voltage output of a single CASE symmetric supercapacitor is above 1 V (though asymmetric supercapacitors have provided more than 2 V) compared to a toxic and flammable organic electrolyte based Li-ion battery (about 3 V).

Since CASE composite will be used as the structural component in addition to energy storage, it should not be periodically replaced. This means that the energy storage device made from these carbon fibers should last throughout the lifetime of the vehicle. Currently, this is not possible with Li-ion batteries.

Figure 2A:
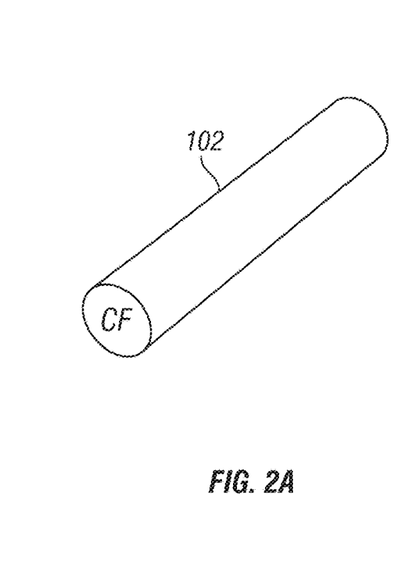
FIGS. 2A-2C schematically show the preparation of vertically aligned and attached graphene on carbon fibers (VGCF). In particular, carbon fiber (FIG. 2A) undergoes electrophoretic deposition (FIG. 2B) to obtain a VGCF electrode (FIG. 2C).
Figure 2B:
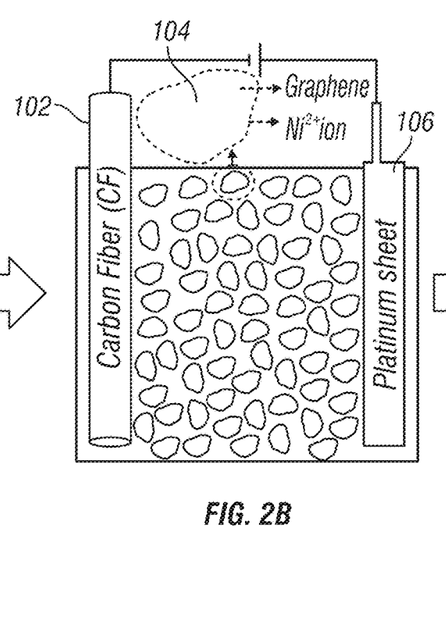
Figure 2C:
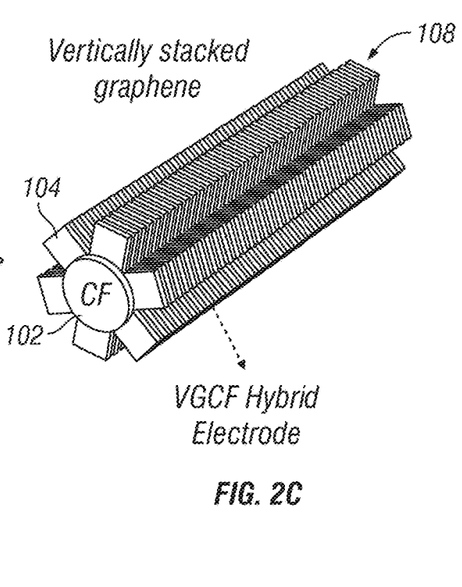

In order to provide the needed high tensile strength and impact energy, supercapacitors are made using cross weaved carbon fiber mats (CWCFM) 50 as shown in FIG. 1 and as described in more detail below. The 3K, 2×2 twill weave available from Fibre Glast is a non-limiting example of a CWCFM that can be used. Graphene 104 is deposited on carbon fibers 102 of CWCFM 50 to produce vertically aligned and attached graphene carbon fibers (VGCF) 108. The process for producing VGCF 108 is shown in FIG. 2 and is set forth in the related applications previously identified. The rationale behind using this CWCFM-like structure is to directly use it as the starting component of the bidirectional composite, which could be subjected to different directional loadings. As a result, this type of charge storage system could also be employed for structural loading applications. Using CWCFM 50 provides high strength at a lighter weight along with charge storage capabilities. Further, the composite is made using commercial epoxies commonly used to make commercial carbon fiber-based composites. Therefore, the composite can sustain the same tensile strength and impact energy as the commercial composites used in the vehicles. An increased voltage can be obtained by connecting multiple CWCFM supercapacitors or hybrid supercapacitor battery devices in series, similar to that in batteries.

Production of CWCFM Electrode for Fabricating Supercapacitors or Hybrid Supercapacitor Battery Devices Carbon fibers (CFs) are attractive to make supercapacitors or hybrid supercapacitor battery devices due to their good electrical conductivity, low cost, easy processability, scalability, good mechanical strength, and low density. When made into a device, they show excellent flexibility with high specific capacitances. A key advantage of CF is that it provides high electrical conductivity in addition to providing electric double-layer capacitance (EDLC). To accomplish carbon fiber-based electrodes for supercapacitor applications, a process by which graphene is attached and grown vertically on CF is used. This process is detailed in the related patent applications identified above and summarized below. Graphene can provide high capacitance due to EDLC as well as faradaic reaction due to the presence of heteroatoms and defect sites. Restacking can be prevented by optimizing the time of deposition.

Figure 3A:
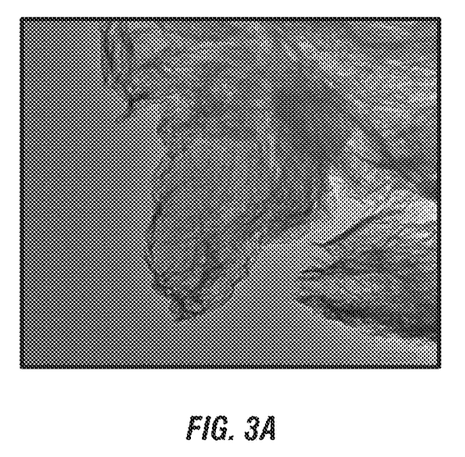
FIG. 3A is a bright-field TEM image of graphene sheets (scale: 100 nm)
Figure 3B:
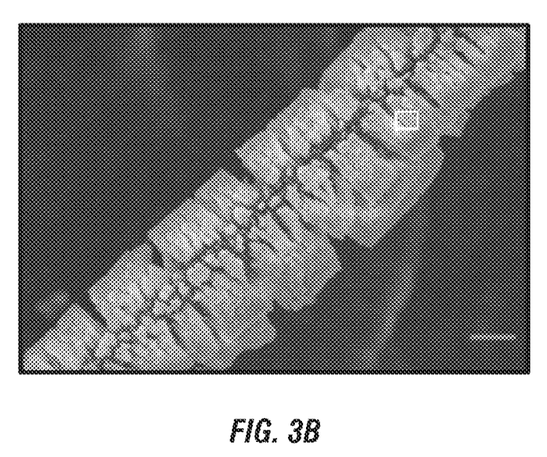
FIG. 3B is an SEM image of graphene attached and aligned on carbon fibers (scale: 5 µm)
Figure 3C:
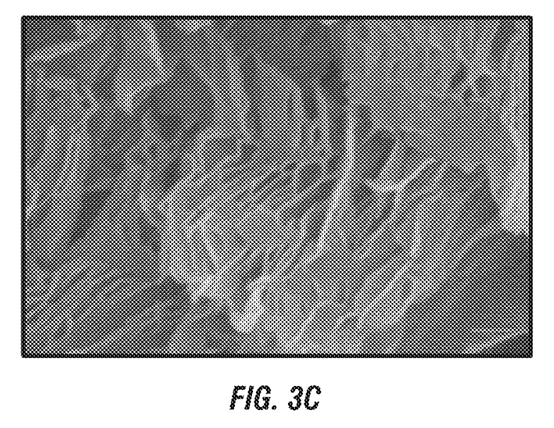
FIG. 3C is an SEM image of the boxed area of FIG. 3B (scale: 200 nm).
Figure 4A:
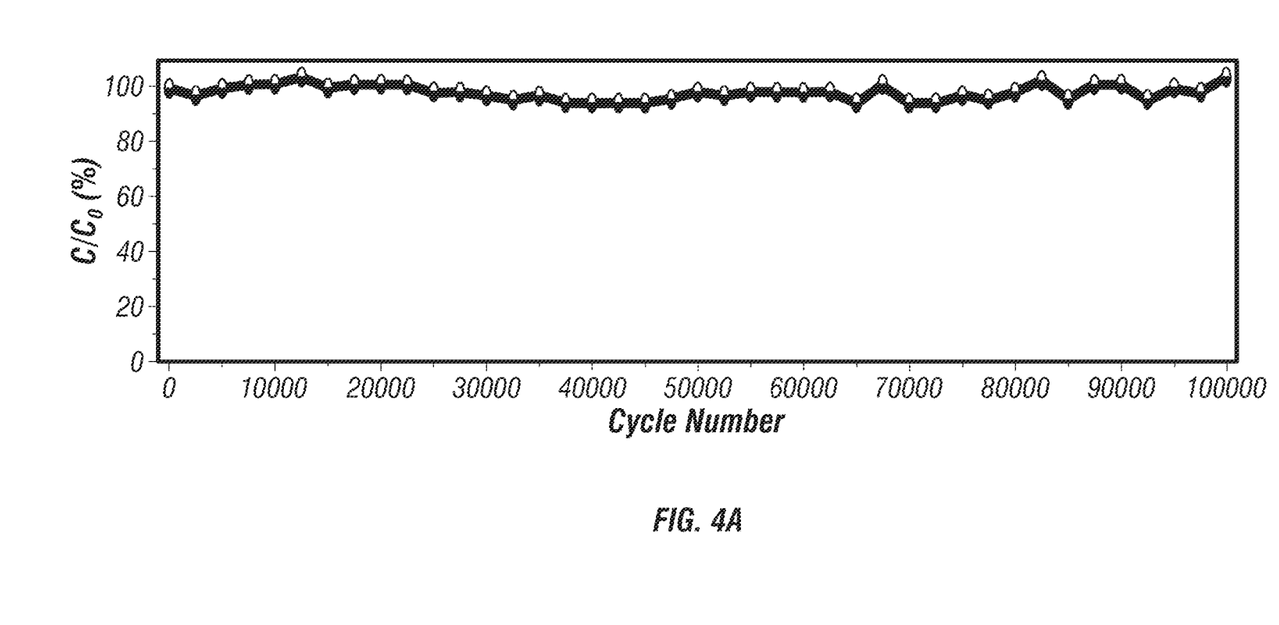
FIG. 4A is a specific capacitance retention plot for the VGCF hybrid continuous 100000 cycles in aqueous 1 M $H_3PO_4$ electrolyte.
Figure 4B:
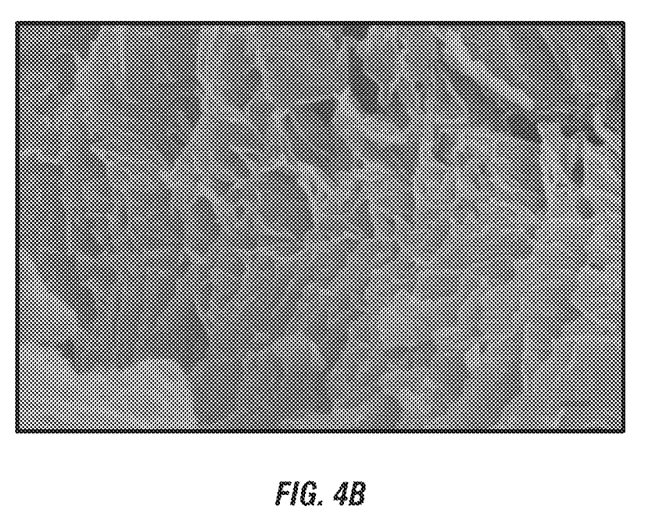
FIGS. 4B and 4C are SEM images of the VGCF at cycle-0 (FIG. 4B) and after cycle-100000 (FIG. 4C) (scale: 200 nm)
Figure 4C:
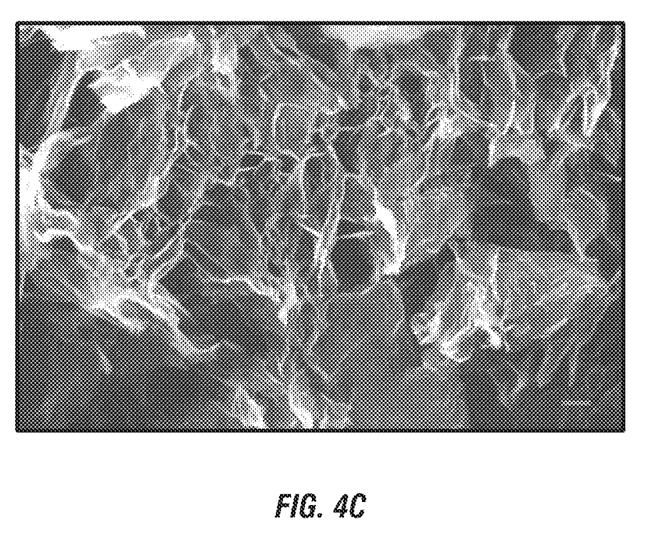
Figure 4D:
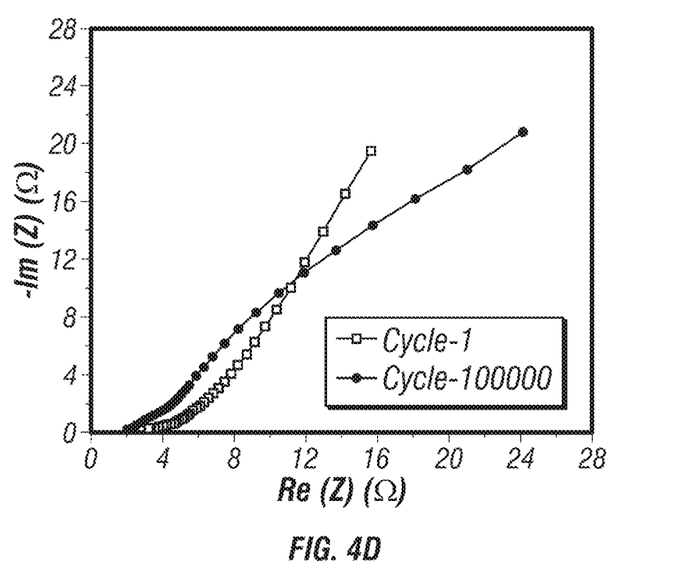
FIG. 4D is a Nyquist plot of the VGCF hybrid electrode at cycle-0 and cycle-100,000.

As schematically shown in the non-limiting example of FIG. 2, a two-electrode cell configuration is used to deposit graphene sheets 104. A graphene dispersed solution mixed with 5 mM of $Ni(NO_3)_2 6H_2O$ in isopropyl alcohol is used as the electrolyte (other electrolytes and/or different concentrations are also envisioned in the instant disclosure). CF (substrate) 102 acts as the working electrode and a platinum foil 106 works as the counter electrode. The electrophoretic deposition is achieved by moving the graphene sheets adsorbed with nickel ions (other metallic ions are also envisioned in the instant disclosure) towards the negatively charged CF electrode under an applied DC voltage of 50 V. Graphene nanosheets can be deposited for about 30 minutes. Vertically aligned and attached graphene nanosheets on carbon fiber are obtained, as shown in the micrographs of FIGS. 3A-3C.

Although any suitable deposition method could be used, electrophoresis has advantages such as short deposition time, simple apparatus for deposition, scalable synthesis, etc.

Production of ASC Electrodes for High Energy Density and Voltage

Pseudocapacitive transition metal oxide (TMOs) can be deposited on the high surface area vertically aligned graphene nanosheets via electrochemical and hydrothermal deposition. Apart from enhanced capacitance, the TMOs helps to achieve high voltage (2-2.4V) asymmetric supercapacitors (ASC) or hybrid supercapacitor battery devices, which can result in an energy density of more than 40 Wh/Kg. Any increase in resistance of the electrodes due to thicker deposition of metal oxides can be addressed by optimizing the resistance by adjusting the thickness of TMOs by varying the deposition time. In one embodiment, the optimization is done based on the feedback from Electrochemical Impedance Spectroscopy (EIS) and Galvanostatic Charge Discharge (GCD) analysis.

Figure 5:
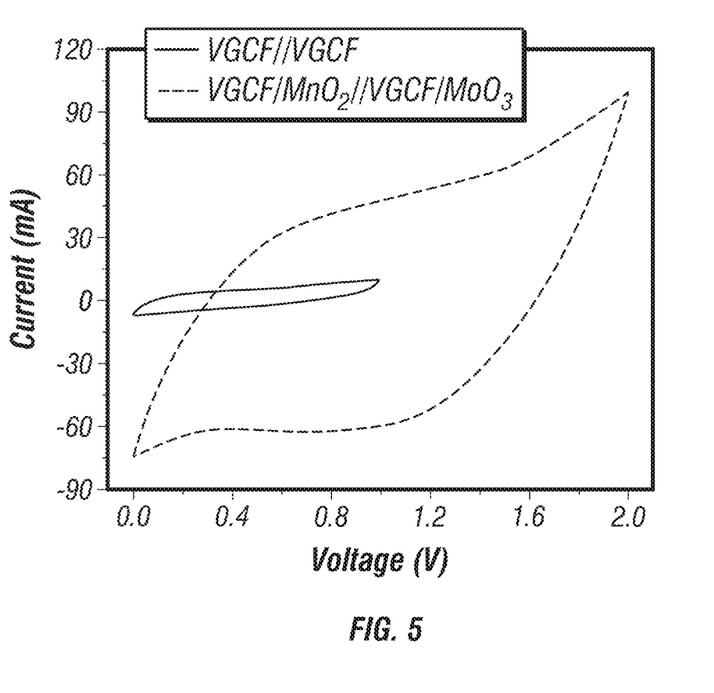
FIG. 5 is a performance comparison of VGCF/VGCF symmetric supercapacitor vs $VGCF/MnO_2/VGCF/MoO_3$ ASC under similar testing conditions.

The VGCF developed on CWCFM enhances the overall surface area. Such high surface area capacitive graphene sheets can be further utilized as conductive templates for depositing pseudocapacitive TMO materials including, but not limited to manganese oxide ($MnO_2$) and molybdenum oxide ($MoO_3$). In one non-limiting example, TMOs are deposited on the high surface area vertically aligned graphene nanosheets via electrochemical and hydrothermal deposition methods. Following facile and scalable hydrothermal or electrochemical deposition techniques, these pseudocapacitive materials can be deposited uniformly over the VGCF structure. Such a hybrid nanostructure stores charges via both EDLC and pseudocapacitive mechanisms, thereby enhancing the overall capacitance. The direct contact obtained between the graphene nanosheets and the TMOs addresses the concern of poor electronic conductivity and rate capability typically seen in TMOs. Results to date revealed that a VGCF electrode shows no degradation of capacitance even after 100,000 cycles, as shown in FIGS. 4A-4D. FIG. 5 shows that there is about 25 times capacitance enhancement when TMOs are deposited on VGCF to make the ASC.

The deposition of $MnO_2$ can be performed via hydrothermal process on VGCF structure using potassium permanganate precursor solution. The deposition time of the individual electrode can be optimized by structural and electrochemical characterization. The electrochemical deposition of the $MoO_3$ on VGCF structure can be done in a solution bath containing molybdenum precursor using a three-electrode configuration.

Production of Supercapacitor Composite Blank (SCB)

As shown in FIGS. 6A-6G, the CWCFM based supercapacitor is assembled into a Supercapacitor Composite Blank (SCB). Note that in the automotive industry as well as other industries, a blank refers to a flat piece of sheet metal prior to being formed into a car body part. Accordingly, the same term is used herein. The approach taken is to assemble the device on epoxy coated CWCFM by encapsulation with another epoxy coated CWCFM followed by multilayer additions while optionally changing their orientations in XY plane to improve mechanical properties. In order to minimize if not eliminate the potential for short-circuiting, contacts from the electrode can be insulated by dip-coating in aqueous-PVA or like insulating material. The disclosure contemplates methods other than dip-coating to apply an insulating layer.

Two glass plates (exemplary dimension of 1.25 ft×1.25 ft), which are used to help uniformly distribute pressure during the molding process, are buffed with a gloss mold release wax or some other buffing device. This is followed by spray coating with a suitable chemical release agent. Examples of a suitable chemical release agent include, but are not limited to, a polyvinyl alcohol release film (e.g. FibreGlast), Easy-lease Chemical release agent, and Parting Wax. After drying (for example 10 minutes), an industrial-grade epoxy-resin (such as West System 105 epoxy resin) and hardener (such as West System 207 special clear hardener) is coated on top of the release agent. Blade coating or other suitable method of coating can be used. This epoxy layer externally encapsulates the composite. The epoxy is compatible with the synthesized standard 1M $Na_2SO_4$-Polyacrylamide (PAM) gel electrolyte which does not interfere with anything else even in the case of accidental mixing.

Figure 6A:
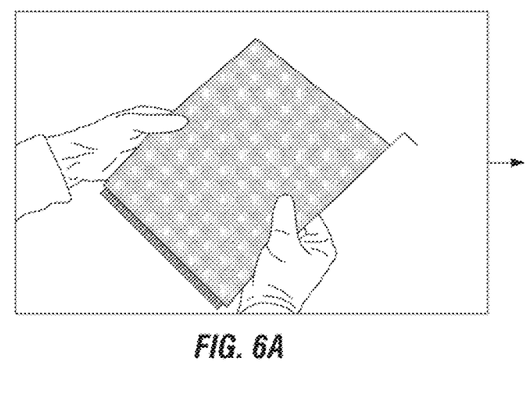
FIG. 6A shows a single layer of CWCFM.
Figure 6B:
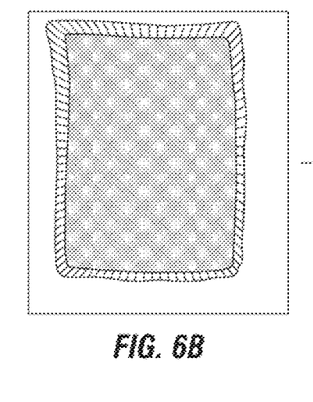
FIG. 6B shows epoxy applied to the CWCFM of FIG. 6A for composite preparation.
Figure 6C:
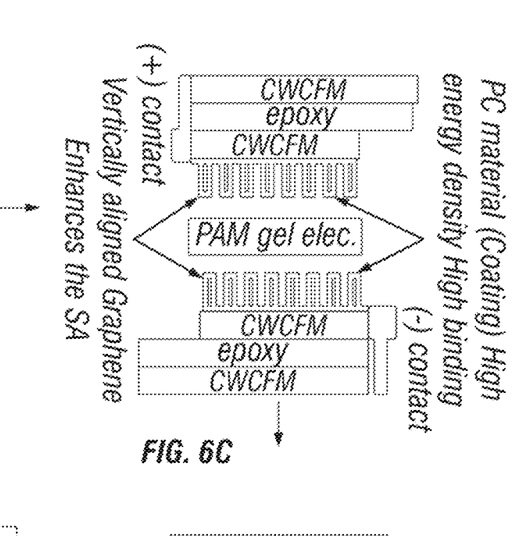
FIG. 6C schematically shows vertically aligning and attaching graphene and depositing TMOs.
Figure 6D:
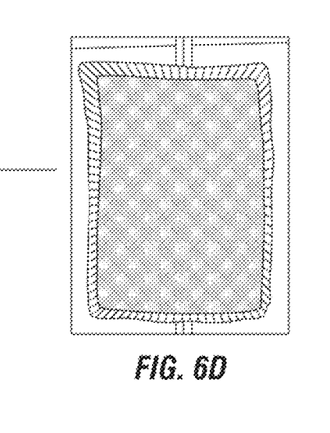
FIG. 6D shows making a SCB.
Figure 6E:
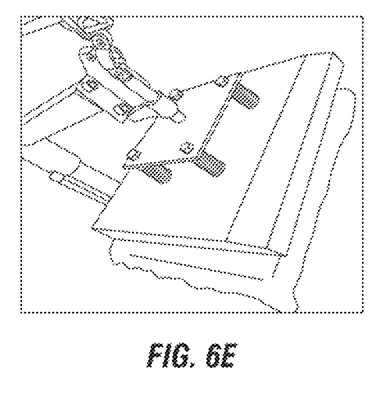
FIG. 6E shows hot pressing SCB.

First, a PVA treated CWCFM (exemplary dimension of 1 ft×1 ft) is taken and a coating of epoxy is applied on top (FIGS. 6A and 6B). Next, the cathode (which is also formed on a CWCFM) is placed at a 45° rotation (in XY plane) with respect to the previous layer. The PAM gel electrolyte is spread uniformly over the active material of cathode. An optional glass fiber mat can be included as a separator. Now an anode (which is also formed on a CWCFM) is placed in the inverted position, with the active material deposited area overlapping with that of the cathode. FIG. 6C shows the midway assembly of the ASC prototype composite blank.

After assembling the asymmetric device directly on the epoxy-coated CWCFM, another epoxy coated CWCFM is placed gently on the anode layer, with a rotation of 45° with respect to the anode layer. Since the CWCFM is cross weaved at 90°, this 45° rotation will align the fiber orientation in this layer with the CF in the first layer. This completes one set. Similarly, multiple layers are stacked over each other with optionally a continuous rotation of 45° in XY plane to achieve more uniform directional strength in the XY plane.

To increase the total voltage window and the energy density of the composite supercapacitors or hybrid supercapacitor battery devices, multiple devices can be assembled in series and parallel combinations, respectively.

Once the desired thickness of the uncured blank is achieved, it is hot-pressed using, for example, a HSINCHU hot press. The hot-press temperature could be set to 170° C. (non-limiting exemplary range of heating temperature from about 150° C. to about 175° C.) and cooling temperature as 60° C. (non-limiting exemplary range of cooling temperature from about 50° C. to about 65° C.) at a pressure of 150 kg/cm² (non-limiting exemplary range of pressure from about 130 kg/cm² to about 160 kg/cm²). As is well known, the hot-press temperature and cooling temperature can be varied depending on the applied pressure and time. This pressing technique is most common for making carbon-fiber-reinforced thermoplastics, but the disclosure contemplates other suitable techniques.

Figure 6F:
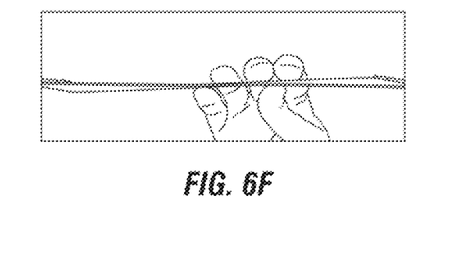
FIGS. 6F and 6G shows side (FIG. 6F) and tilted angle (FIG. 6G) views of a final working energy storing SCB.
Figure 6G:
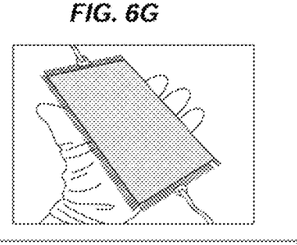

Composite sheet thicknesses (representative examples include 1 mm and 3 mm thickness, but the thickness could be made for any required thickness, for example, by stacking multiple layers) can be made to have the desired combination of electrical and mechanical properties. A SCB composite is shown in FIGS. 6F and 6G.

Evaluation of the Electrochemical Performance of SCB

An electrochemical workstation can be used to evaluate the performance of SCBs.

Electrochemical Impedance Spectroscopy (EIS) can be used to obtain the equivalent series resistance (ESR), and charge transfer resistance ($R_{ct}$) of the SCB. Results to date show that SCB composite (without TMO deposition) exhibit an ESR and $R_{ct}$ values of 1.5Ω and 750 mΩ, respectively.

The cyclic voltammetry (CV) and Galvanostatic Charging/Discharging (GCD) measurements provide gravimetric and areal capacitance, energy density and power density of the assembled SCB. The carbon fiber-based composite supercapacitor with VGCF electrodes exhibit slightly sloped curves exhibiting the presence of both electric double capacitor (EDLC) and faradaic charge storage mechanism. The symmetric solid-state device composite assembled with two VGCF electrodes (without TMO deposition) with a solid polymer gel electrolyte exhibited capacitance as high as 213 F/g, energy density about 76 Wh/Kg and power density of 2.5 kW/Kg. The excellent electrochemical properties obtained for the VGCF supercapacitor are further improved with the addition of pseudocapacitive TMOs. Some results are shown in FIG. 5.

The SCB would be charged and discharged continuously at a fixed scan rate or current density to evaluate their charge retention ability. Similar to symmetric SCB devices, results show that asymmetric SCB shows more than 15,000 charge-discharge cycles with 100% retention. A cycle life of more than 100,000 is expected for this device.

In an environmental chamber, the temperature can be varied from −20° C. to as high as 70° C. to test the performance of the assembled composite. An anti-freezing agent, such as for example ethylene glycol, can be added into the gel electrolyte of the assembled device if there is a degradation of the performance at low temperatures. As the electrochemical performance may be affected by the addition of this anti-freezing agent, testing can be performed. Further an accelerated aging test can be performed to determine the lifetime of the composite.

Evaluation of the Mechanical Properties of SCB

Evaluation of mechanical properties can be performed in accordance with the industry standards for composites, and subsequent comparison with commercial-grade steel (ASTM A36, AISI 1020) and aluminum used for automotive bonnets (hoods), trunk, and roof-top. The tested mechanical properties include the following.

One test is a tensile test of the blank, on MTS landmark servo-hydraulic (50 kN) in accordance with ASTM D3039 and ISO 527-2. The fabricated prototype SCB of 1 mm thickness is cut into dumbbell-shaped tensile bars according to the guidelines given in ASTM D3039. Since ASTM D3039 and ISO 527-2 provide the necessary guidelines for tensile testing, which goes beyond the elastic limit (in the plastic region), especially for polymer matrix composite, this would be an appropriate standard to follow. In accordance with the standard, MTS landmark servo-hydraulic testing system at a constant speed of 5 mm/min with a standard 1 kN load is used. The yield strength is determined by the first maxima in the stress-strain curve. The average value is taken from five runs of each sample.

Another test is a hardness test (on Mitutoyo ATK-600 Hardness testing Machine as per ASTM D785). The R scale is chosen with ½" ball intender. Initially, 10 kgf minor load and 60 kgf major load can be applied on a 1 mm thick composite blank. The sample is tested five times to take an average value. ASTM D785 will be used to get the necessary guidance and standards to follow.

A flexural Test (on Instron UTM 5566) in accordance with ASTM D 790-98 can also be performed. As set forth in the standard, Testing method 1—Procedure A, which is a 3-point loading system utilizing center loading, is used on an Instron/MTS universal testing machine. Flexural strength and flexural modulus are calculated from the generated dataset.

Izod Impact Test, in accordance with ASTM D256, is performed in order to obtain the value of 'work of fracture' (WOF) by cutting the composite blank in a rectangular shape of thickness 3 mm, 12 mm wide and 62 mm long. These recommended sizes are in accordance with ASTM D256, which deals with Impact energy resistance for plastically deforming materials. To start with, the striker energy can be set at 5 J, with a 60 mm span length and 30° angle of attack. Results to date show the tensile strength, flexural strength and impact strength sufficient for application in the EV industry.

A thermal stability test uses thermogravimetry analysis (TGA). Since the composite may have to withstand high heat (from the engine) or freezing temperature (like during snowfall), the thermal stability of the composite becomes important. Perkin-Elmer TGA-7 can be used to check the temperature stability.

As the prototype SCB can be used for the development of the actual car body parts like the bonnet (hood), roof, trunk, and chassis, all mechanical properties data can be compiled and compared against those of commercial-grade steel and aluminum used for these body parts.

Design and Fabrication of a Composite Bonnet; Load Tests in Accordance with the Codes from New Car Assessment Program (NCAP) from (US DOT, Euro NCAP)

Prototype composite bonnet can be fabricated using the bonnet of a commercial available electric vehicle (e.g. NISSAN Leaf EV) as a mold and tested for its electrical and mechanical properties.

Applicable design and test codes include:

Laboratory test procedure for new car assessment program side-impact rigid pole test (US-DOT Rev. Sep. 19, 2012).

Laboratory test procedure for new car assessment program frontal impact testing (US-DOT Rev. Sep. 19, 2012).

Bonnet deflection due to body loading, EuroNCAP

In making the mold, a proper barrier should be made, avoiding mechanical locking formations for easy removal of mold. An Easy-lease chemical release agent (Easy Composites) will be used, which stops the gel coat from sticking to the bonnet surface. A gloss mold release wax can be applied before spray coating with a release agent, to give it industrial-grade finish. Further, a vinyl-ester based tooling gel coat, which is compatible with polyester, vinyl-ester, or epoxy resin, can be applied all over the surface, followed by placement of lightweight chopped glass-fiber strand mat. On top of this, a coupling coat of the tooling resin can be applied and a similar process will be repeated as needed (e.g. 3-4 times). After overnight curing, the mold is removed and then used to fabricate a supercapacitor bonnet following the SCB process discussed above.

In order to replace a damaged panel and maintain the original electrical connections, the panels can be built in such a way that two panels can be easily clicked in place, providing the required continuity in electrical connection.

To summarize representative metrics:
1. Energy density of the composite: >10 Wh/Kg; Power density: >2 kW/Kg
2. Charge-discharge cycles: more than 10,000 with less than 15% overall degradation
3. Tensile strength: >50 MPa
4. Working temperature range: −20° C.-70° C.

Converting the electric vehicle's body panel into energy storage component using carbon fiber-based composite supercapacitor reduces the net weight of the vehicle and at the same time, it increases the miles/charge of the vehicle. Also, the supercapacitor which is known to offer high power density will help in increasing the initial acceleration without giving too much load on the batteries, thus enhancing the lifetime of batteries. CASE composite supercapacitors or hybrid supercapacitor battery devices power the electric vehicles in complement with batteries.

The CASE supercapacitor or hybrid supercapacitor battery device directly addresses the current requirements of the electric vehicle industry. Since the CASE supercapacitor or hybrid supercapacitor battery device is in the form of carbon fiber-based composite, it can directly replace many of the existing structural components of electric vehicles.

Since the base of the invention is carbon fiber-based energy storage, it could be used for various applications ranging from powering wearable electronics to electric vehicles. Some other applications are shown in Table 1.

TABLE 1

CASE composite value proposition for various markets.
Carbon-fiber based energy-storing composite

| Application | CASE composite values |
|---|---|
| Electric car manufacturers | Lighter body panels |
| | Nearly unlimited charging |
| | Non-toxic components |
| Aerospace industries including NASA | Lighter fuselage which can store energy |
| | Advantageous for future all-electric aircrafts |
| | Better energy storage capability for space vehicles |
| Wearable device manufactures | Storing energy in the case and structural components |

Thus, although an electric vehicle body panel has been used as an exemplary embodiment, the disclosure contemplates other applications of the carbon fiber-based energy storage disclosed herein. For example, the carbon fiber-based composite supercapacitor or hybrid supercapacitor battery could be used as a structural component for different electrical devices and appliances.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains.

In this regard with respect to the electrode material, although the disclosure utilizes metal oxides like $Mn_3O_4$, $MnO_2$, $MoO_2$, $MoO_3$ in the exemplary embodiments, the disclosure contemplates the use of other suitable electrode materials that have applications as supercapacitor electrode materials. Non-limiting types include those used in EDLCs, pseudocapacitors, and asymmetric supercapacitors. Further, the disclosed composite can show battery type storage if battery materials are used for the electrode material.

With respect to the electrolyte materials, although the disclosure utilizes a particular polymer gel type electrolyte, the disclosed composite could also use other polymer gel type electrolytes as well as suitable electrolytes such as solid state and structural electrolytes.

Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended representative claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the representative claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following representative claims be interpreted to embrace all such variations and modifications.

What is claimed is:

1. An electric vehicle body panel comprising at least one carbon fiber-based composite supercapacitor or hybrid supercapacitor battery device, wherein the at least one supercapacitor or hybrid supercapacitor battery device includes vertically aligned and attached graphene on carbon fibers of a cross weaved carbon fiber mat.

2. The body panel of claim 1, wherein the at least one supercapacitor or hybrid supercapacitor battery device comprises a plurality of supercapacitors or hybrid supercapacitor battery devices connected in series and parallel combinations.

3. The body panel of claim 1, wherein the vertically aligned and attached graphene on carbon fibers include a pseudocapacitive transition metal oxide layer.

4. The body panel of claim 3, wherein the pseudocapacitive transition metal oxide layer includes manganese oxide or molybdenum oxide.

5. The body panel of claim 1, wherein the at least one supercapacitor or hybrid supercapacitor battery device includes a plurality of cross weaved carbon fiber mats.

6. The body panel of claim 5, wherein the plurality of cross weaved carbon fiber mats is separated by a layer of epoxy.

7. The body panel of claim 5, wherein adjacent mats of the plurality of cross weaved carbon fiber mats are oriented 45 degrees with respect to each other.

8. An electric vehicle body panel comprising at least one carbon fiber-based composite supercapacitor or hybrid supercapacitor battery device, wherein the at least one supercapacitor or hybrid supercapacitor battery device comprises:
 a first outer cross weaved carbon fiber mat;
 a cathode contacting the first outer cross weaved carbon fiber mat and including vertically aligned and attached graphene on carbon fibers of a cross weaved carbon fiber mat;
 a gel electrolyte contacting the cathode;
 an anode contacting the gel electrolyte and including vertically aligned and attached graphene on carbon fibers of a cross weaved carbon fiber mat; and
 a second outer cross weaved carbon fiber mat contacting the anode,
 wherein the first outer cross weaved carbon fiber mat, cathode, anode, and second outer cross weaved carbon fiber mat are in a stacked configuration.

9. The body panel of claim 8, wherein at least one of the first and second outer cross weaved carbon fiber mats is coated with an epoxy.

10. The body panel of claim 9, wherein the first outer cross weaved carbon fiber mat and cathode are oriented 45 degrees with respect to each other and wherein the anode and second outer cross weaved carbon fiber mat are oriented 45 degrees with respect to each other.

11. The body panel of claim 10, wherein the gel electrolyte is a polyacrylamide gel electrolyte.

12. The body panel of claim 11, wherein the gel electrolyte is a coating applied to at least one of the cathode and the anode.

13. The body panel of claim 12, wherein the at least one supercapacitor or hybrid supercapacitor battery device comprises a plurality of supercapacitors or hybrid supercapacitor battery devices.

14. The body panel of claim 13, wherein the plurality of supercapacitors or hybrid supercapacitor battery devices is connected in series and parallel combinations.

15. The body panel of claim 12, wherein the vertically aligned and attached graphene on carbon fibers of at least one of the cathode and anode include a pseudocapacitive transition metal oxide layer.

16. The body panel of claim 15, wherein the pseudocapacitive transition metal oxide layer includes manganese oxide or molybdenum oxide.

17. The body panel of claim 12, wherein the at least one supercapacitor or hybrid supercapacitor battery device has an energy density of at least 10 Wh/Kg, a power density of at least 2.5 kW/Kg, and charge-discharge cycles of more than 5,000 with less than 15% degradation.

18. The body panel of claim 17, wherein the body panel has a tensile strength of at least 50 MPa.

19. An electric device comprising at least one carbon fiber-based composite supercapacitor or hybrid supercapacitor battery device, wherein the at least one supercapacitor or hybrid supercapacitor battery device includes vertically aligned graphene on carbon fibers of a cross weaved carbon fiber mat.

20. The electric device of claim 19, wherein the at least one supercapacitor or hybrid supercapacitor battery device includes a plurality of cross weaved carbon fiber mats; wherein the plurality of cross weaved carbon fiber mats is separated by a layer of epoxy; and wherein adjacent mats of the plurality of cross weaved carbon fiber mats are oriented 90 degrees with respect to each other.

* * * * *